(12) United States Patent
Zhou

(10) Patent No.: US 7,118,052 B2
(45) Date of Patent: Oct. 10, 2006

(54) METHOD AND APPARATUS FOR ATOMISING LIQUID MEDIA

(75) Inventor: Chuanjie Zhou, Altrincham (GB)

(73) Assignee: Novel Technical Solutions Limited, Manchester (GB)

( * ) Notice: Subject to any disclaimer, the term of this patent is extended or adjusted under 35 U.S.C. 154(b) by 449 days.

(21) Appl. No.: 10/475,039

(22) PCT Filed: May 9, 2002

(86) PCT No.: PCT/GB02/02143

§ 371 (c)(1),
(2), (4) Date: Oct. 16, 2003

(87) PCT Pub. No.: WO02/089998

PCT Pub. Date: Nov. 14, 2002

(65) Prior Publication Data

US 2004/0124270 A1 Jul. 1, 2004

(30) Foreign Application Priority Data

May 9, 2001 (GB) ................................. 0111257
May 9, 2001 (GB) ................................. 0111259

(51) Int. Cl.
*B05B 7/06* (2006.01)

(52) U.S. Cl. ........................................ 239/424; 222/591
(58) Field of Classification Search ................. 239/418, 239/424, 79, 82, 85, 132.3; 222/591, 592; 75/0.5 C, 0.5 B, 0.5 BB, 338, 255
See application file for complete search history.

(56) References Cited

U.S. PATENT DOCUMENTS

| 3,326,467 A | * | 6/1967 | Fortman ..................... 239/424 |
| 4,575,325 A | | 3/1986 | Duerig et al. |
| 5,024,695 A | | 6/1991 | Ashdown et al. |

* cited by examiner

*Primary Examiner*—David A. Scherbel
*Assistant Examiner*—Thach H Bui
(74) *Attorney, Agent, or Firm*—DeMont & Breyer, LLC

(57) ABSTRACT

There is disclosed apparatus for atomizing liquid media comprising an ultrasonic gas atomization nozzle (11) having a gas flow path (12) from a plenum chamber (17) which flow path is straight and is provided with a plurality of resonance cavities (31).

12 Claims, 5 Drawing Sheets

METHOD AND APPARATUS FOR ATOMISING LIQUID MEDIA

This invention relates to methods and apparatus for atomising liquid media, and also to making polymer powder.

Conventionally, polymer powder is made by grinding extruded polymer pellets, often under cryogenic conditions. Powder size distribution and powder morphology are difficult to control, while the process is expensive and energy-intensive. Moreover, the grinding equipment can contaminate the product, which is also susceptible to environmental pollution.

Methods and apparatus for atomising liquid media are known for example from U.S. Pat. No. 5,228,620 and earlier publications, and are used e.g. to produce metal powder by atomising a molten metal stream into droplets which solidify into spherical or nearly spherical particles. The most important characteristics of atomised powders are their morphology shape, size and size distribution. The powder size and morphology subsequently influences the engineering properties, i.e. flowability, packability, compressibility, etc., and the size distribution indicates the yield of useful material available for a specific application. It is therefore desirable to control the average particle size, the morphology, and the powder size distributions produced during atomisation.

Prior to the invention, efforts in this area have resulted in the development of several techniques. One method used a standing ultrasonic wave generated between two ultrasonic transmitters to disintegrate a molten material into fine droplets (European Patent No. 0 308 600). The other design is an ultrasonic gas atomisation device, in which the gas channel incorporates a resonance cavity (Hartman shock tube) in order to create a high frequency pulse in the gas. The atomiser makes use of the combination of high frequency pulsed gas pressure and supersonic gas streams will promote efficient atomisation of the molten material, resulting in a narrow spread of fine droplet size (U.S. Pat. No. 2,997,245). However, the amount of gas delivered by an atomisation nozzle is clearly one of the most important design parameters. The initial design has suffered from a major disadvantage, in that it requires high operating gas pressure (from 6.5 MPa to 12 MPa) (U.S. Pat. No. 5,228,620). Abrupt frictional losses at areas in the channel are found to be 36% in total pressure between the plenum chamber and nozzle exit in the Unal technical article (#1) "Frictional Losses in Ultrasonic Gas Atomisation Nozzles", Powder Metallurgy, Vol. 33, No 3, pp.327–333 (1990).

The present invention provides methods and apparatus for atomising liquid media that overcome at least some of the problems of the prior art.

The invention comprises, in one aspect, apparatus for atomising liquid media comprising an ultrasonic gas atomisation nozzle having a gas flow path from a plenum chamber which flow path is straight and is provided with a plurality of resonance cavities.

The resonance cavities may be spaced apart along the gas flow path, and may be inclined to the gas flow path in the sense of being converged therewith in the direction of gas flow.

The resonance cavities may be such as will impose an ultrasonic frequency on the gas flow, which may be in the range 20–60 KHz.

The gas flow path may comprise an annular convergent nozzle and the resonance cavities then comprise cylindrical cavities formed in both interior walls of the annular nozzle. The diameters of the cavities may be between 1/12 and 1/8 of the mean nozzle diameter. There may be between ten and sixty cavities in such an arrangement spaced along and around the annular nozzle.

The gas flow path may, however, comprise a multi-jet arrangement, and the diameters of the cavities may be between 1/10 and 1/3 of the diameter of the jet passages into which they open. There may be between two and eight cavities in each jet. There may be between four and twenty jets spread on one circle of radius around a liquid stream. The jets may be arranged in more than one angle toward liquid stream to perform multi-stage atomisation.

The cavities may be oriented at between 10° and 60° to the flow direction through the nozzles.

The invention also comprises a method for atomising a liquid medium comprising impinging a flow of the liquid medium with a high-velocity gas stream with a superimposed ultrasonic frequency generated by resonance in the gas stream.

The ultrasonic frequency may be in the range 20–60 KHz, and the high-velocity gas flow may be at supersonic velocity.

The nozzle used may be of any type including free-fall and confined types, annular and multi-jet nozzles, and may be of any miniature type, including inhalers and spray can nozzles.

Such nozzles may also be used, with the invention, to atomise various liquids including molten metals, polymer melts, solvent based solutions, and other forms of liquids. A liquid may be formed by melting in a crucible or an extruder or dissolving in a solution, and may be delivered to a die to form liquid streams.

In particular the invention also comprises a method for producing polymer powder comprising melt extruding a polymer material and impinging a high velocity gas stream on to the molten extrudate.

A single liquid stream may be impinged while in free fall from a die. A liquid stream may comprise a film or filaments, in which latter case the filaments may emerge as sheet or ribbon from a line of spinnerettes. The film or sheet- or ribbon-like liquid stream, may be impinged on both faces by gas streams.

The gas stream velocity may be up to Mach 2.

The die may comprise heater arrangements to ensure the liquid is evenly heated, and still molten in the region of impingement.

Air, nitrogen and argon may be used as atomising gas. Atomising gas may be heated by a gas heater to atomise certain types of liquids. Using the invention, the cost of special gases—such as nitrogen and argon—used in gas atomisation, can be substantially reduced. Not only is less gas used, but the maximum working pressure, of about 17 bar, generated from conventional cryogenic supply of such gases is suitable for use with methods and apparatus of the invention, avoiding the need for high pressure cryogenic pumping and high pressure storage vessels used in conventional gas ultrasonic atomisation. The gas used should, of course, not adversely react on or with the atomised polymer or other material.

The invention also comprises apparatus for making polymer powder comprising a die from which polymer is extruded and nozzle means impinging a high velocity gas stream on the extrudate from the die.

The die may comprise a slit for extruding a film or a line of spinnerettes for extruding a sheet or ribbon of filaments.

The nozzle means may comprise a slit-form nozzle either side of the die directed towards the issuing extrudate. The nozzle mans may impinge the gas stream at an angle to the issuing extrudate so as to have a component of velocity in the direction of flow of the extrudate. The nozzle means may form a V-shaped gas stream with an included angle between 30° and 90°.

The die may comprise heater arrangement to ensure the extrudate is evenly heated and still molten in the region of impingement.

The invention also includes powder, inter alia polymer powder, made by methods or apparatus as herein disclosed. Such powders may be characterised by comprising spherical or nearly spherical particles.

Methods and apparatus for atomising liquid media according to the invention will now be described with reference to the accompanying drawings, in which.

Figure 1:
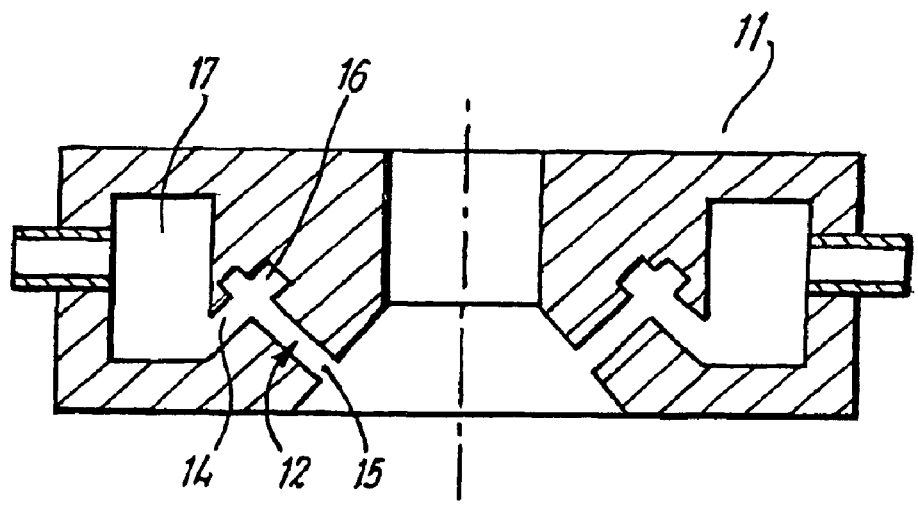
FIG. 1 is a diagrammatic cross-section of a conventional flow channel.

FIG. 1 illustrates a conventional gas atomisation nozzle 11, following U.S. Pat. No. 2,997,245. The flow channel 12 comprises first and second legs 14, 15, joined at right angles, with a resonance cavity 16. The abrupt change in the direction of flow between the two legs 14, 15 gives rise to considerable energy loss and limits nozzle efficiency.

Figure 2:
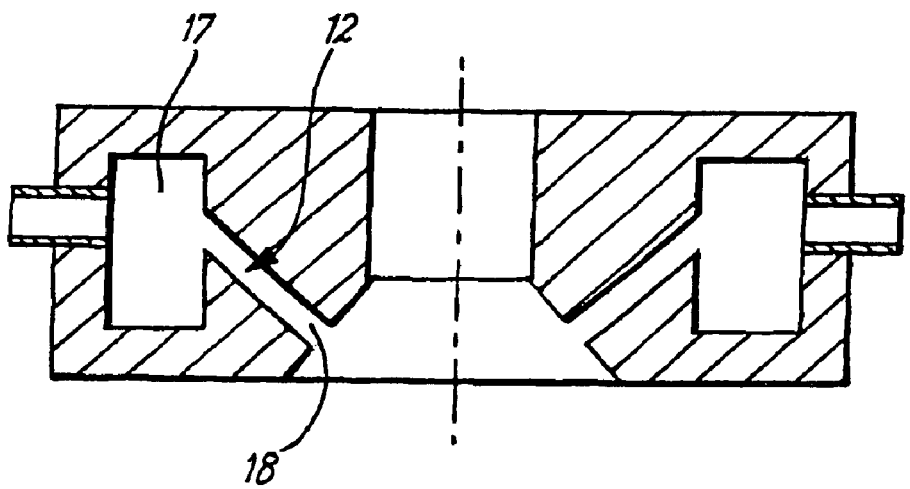
FIG. 2 is a diagrammatic cross-section of a flow channel modified in accordance with the present invention.

FIG. 2 shows an improved design according to the invention in which the flow channel 12 has a single straight line leg from the plenum chamber 17 to the nozzle exit 18. Elimination of the right-angled leg arrangement of FIG. 1 improves the efficiency of the arrangement by eliminating energy losses involved in redirecting the direction of gas flow.

Not shown in FIG. 2 are alternative arrangements for generating ultrasonic frequency sound in the gas flow. These are indicated, however, in FIG. 3, where more resonance cavities 31 are shown opening into the flow channel 12.

Figure 3:
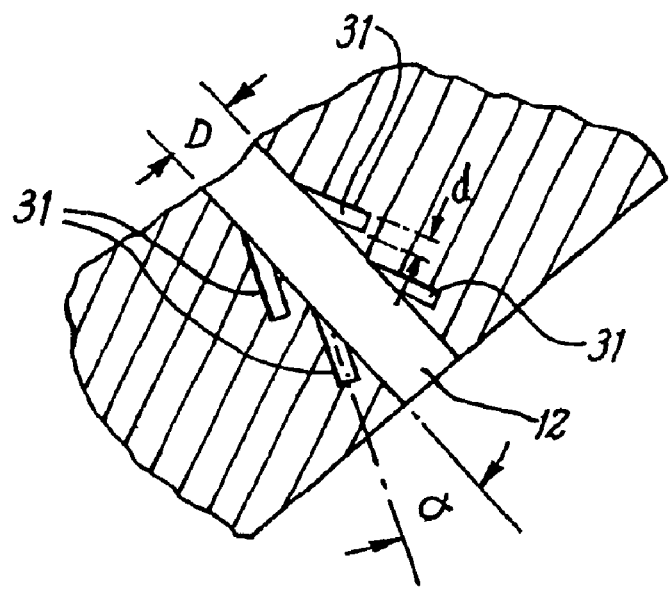
FIG. 3 is a detail not shown on the cross-section of FIG. 2.

FIG. 3 shows opposed cavities 31 in a circular section jet flow channel 12, the cavities 31 comprising cylindrical bores having a diameter 'd' of $\frac{1}{10}$ to $\frac{1}{3}$ of the diameter 'D' of the channel 12. The cavities 31 could be of other shapes, but it is easier to machine circular-section cavities usually.

In a convergent annular type nozzle, the cavities 31 would be much as illustrated in FIG. 3 but spaced apart circumferentially around the annular nozzle as well as lengthwise along the flow path.

For annular nozzles the bore diameter of the cavities can be between $\frac{1}{12}$ and $\frac{1}{8}$ of the mean nozzle diameter.

Between two and eight resonance cavities can usually be arranged in each jet of a multi-jet arrangement; between ten and sixty resonance cavities can be used in annular nozzle arrangements.

The geometry, distribution and number of resonance cavities will determine the intensity and frequency of the ultrasonic superimposition. Typical frequencies are 20–60 KHz, produced in a nitrogen gas stream generated by a plenum pressure between 1.4 and 1.7 MPa at up to Mach 2.

Figure 4:
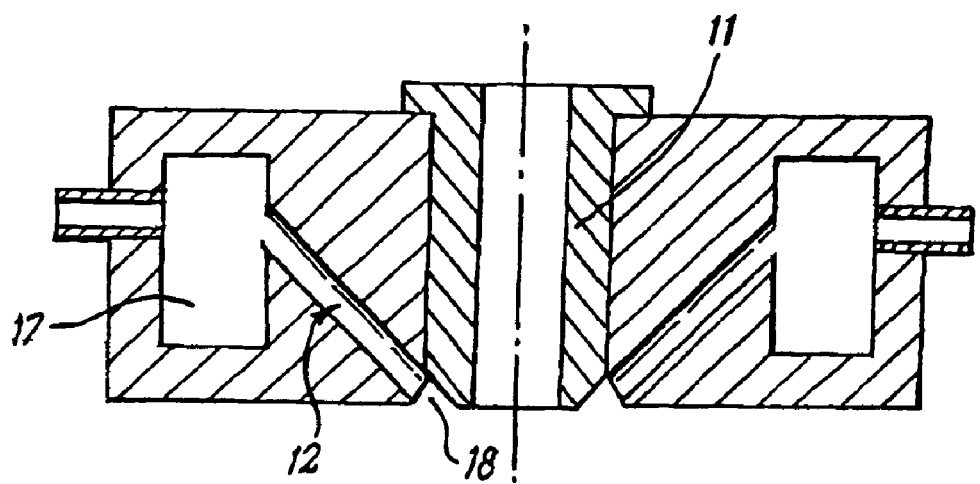
FIG. 4 is a cross-section like FIG. 2 of another type of gas flow arrangement.

FIG. 4 illustrates a confined type nozzle (which may be either annular or multi-jet) according to U.S. Pat. No. 3,252,783 and U.S. Pat. No. 5,228,620 adapted to the present invention.

In a typical arrangement a melting furnace was charged with 30 Kg of 316 stainless steel, melted by induction and heated to a temperature of 1600° C. Eight gas jet discharge orifices of free fall type were arranged to define an apex angle of 45°. The nozzles were supplied with nitrogen gas at 1.4 MPa. For comparison, nozzles with and without resonance cavities were used. In nozzles with cavities, there were six, each of 1 mm diameter uniformly arranged in each gas channel, formed at an angle of 15° to the direction of the channel.

Figure 5:
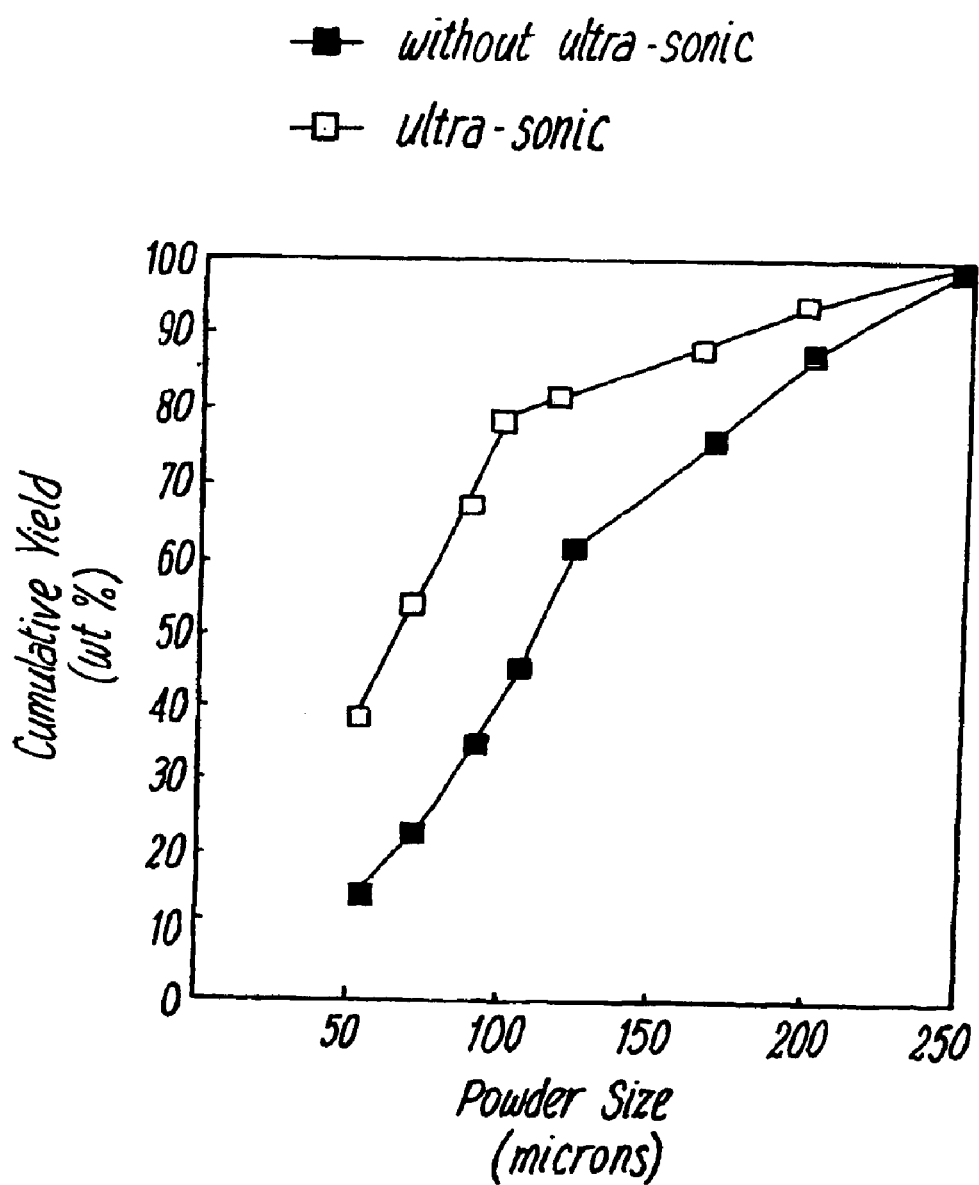
FIG. 5 is a comparative graphical depiction of particle size distribution of a typical product of a prior art process and a process according to the invention.

Atomised droplets were collected after solidifying and size classified, the results being shown in FIG. 5. About 40% by weight of the particles produced by the nozzles with resonant cavities according to the invention were of less than 38 μm diameter, compared to only about 15% of those produced by nozzles without resonant cavities, indicating that the ultrasonic superimposition produced by the resonant cavities has significantly enhanced the atomisation efficiency of the nozzles.

Figure 6:
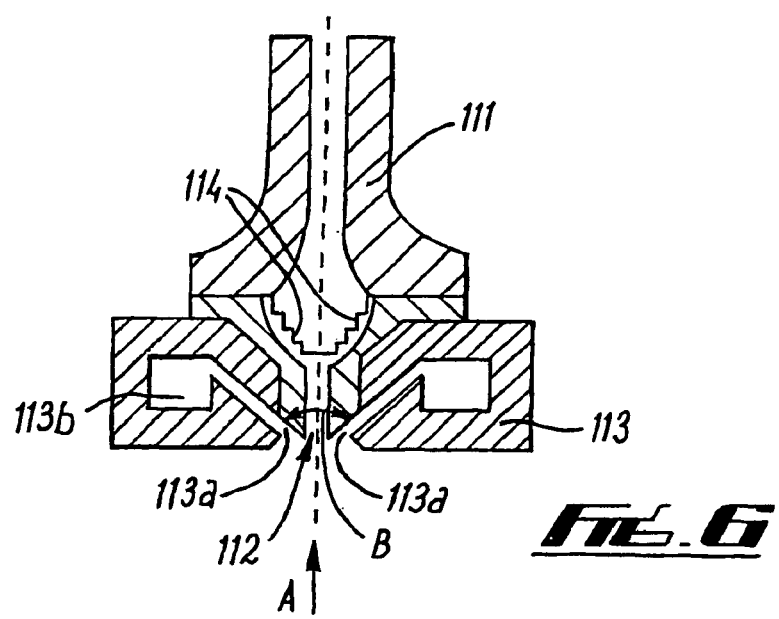
FIG. 6 is a cross-section of a melt die with gas stream nozzle means.
Figure 7:
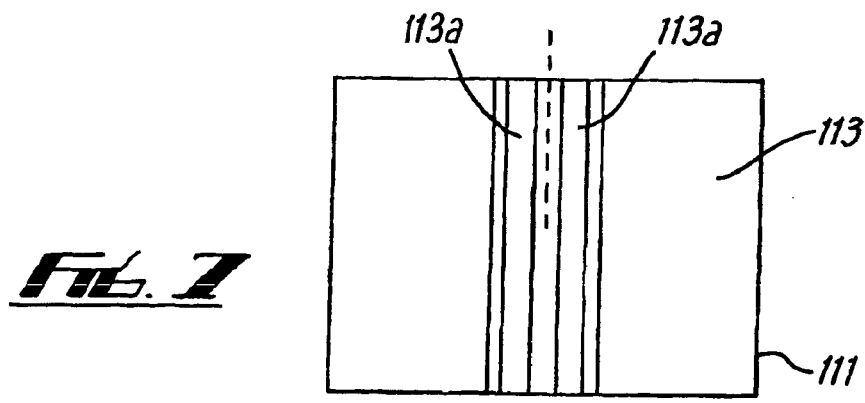
FIG. 7 is a view on arrow A of FIG. 6 of a first embodiment.
Figure 8:
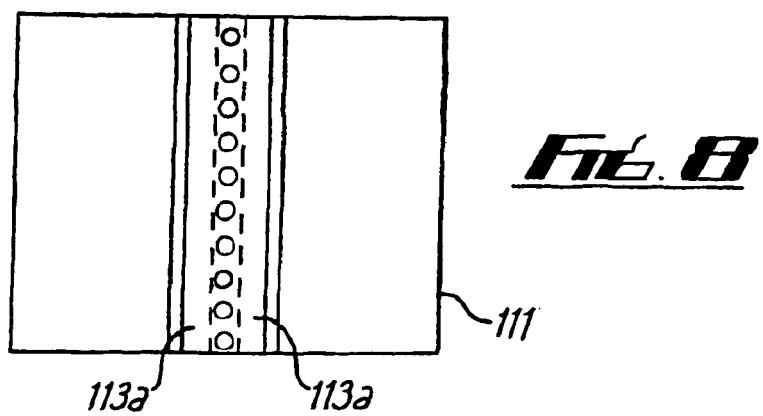
FIG. 8 is a view like FIG. 7 of a second embodiment.

The FIGS. 6 to 8 illustrate apparatus for atomising liquid streams e.g. of polymer material comprising a die 111 from which a melt 112 is delivered in the form of a film (FIG. 7) or a sheet or ribbon of filaments (FIG. 8), and gas stream nozzle means 113 impinging a high velocity, e.g. Mach 1 or above, stream of gas on either side of the melt 112.

The die 111 has a heater arrangement shown diagrammatically as an electric resistance element 114 to ensure the melt 112 is evenly heated and molten where the nozzle arrangement 113 impinges the melt 112.

The nozzle arrangement 113 comprises nozzles 113a directed at the melt 112 from either side thereof and angled so that the gas stream from each has a component velocity in the direction of flow of the melt 112, which is itself in free fall from the die 111. The nozzles 113a are outlets from plenum chamber means 113b and are directed so as to form a V-shaped flow enclosing an angle B between 30° and 90°.

The extruder is arranged to deliver melt to the die 111 so that the cross-section of the melt 112 is equal to that of the die orifice. The gas stream is desirably at least supersonic, possibly up to Mach 2 for best atomisation. The particle size of the product powder is inter alia governed by the cross-section of the melt 112.

In a typical arrangement an extruder was used to melt PE-based polymer to a temperature of 150° C. Eight gas jet discharge orifices were arranged to define an apex angle of 45°. The nozzles were supplied with compressed air at 0.4 Mpa. Compressed air was heated to a temperature of 150° C. by a gas heater. In nozzles with cavities, there were six, each of 1 mm diameter uniformly arranged in each gas channel, formed at an angle of 15° to the direction of the channel.

Figure 9:
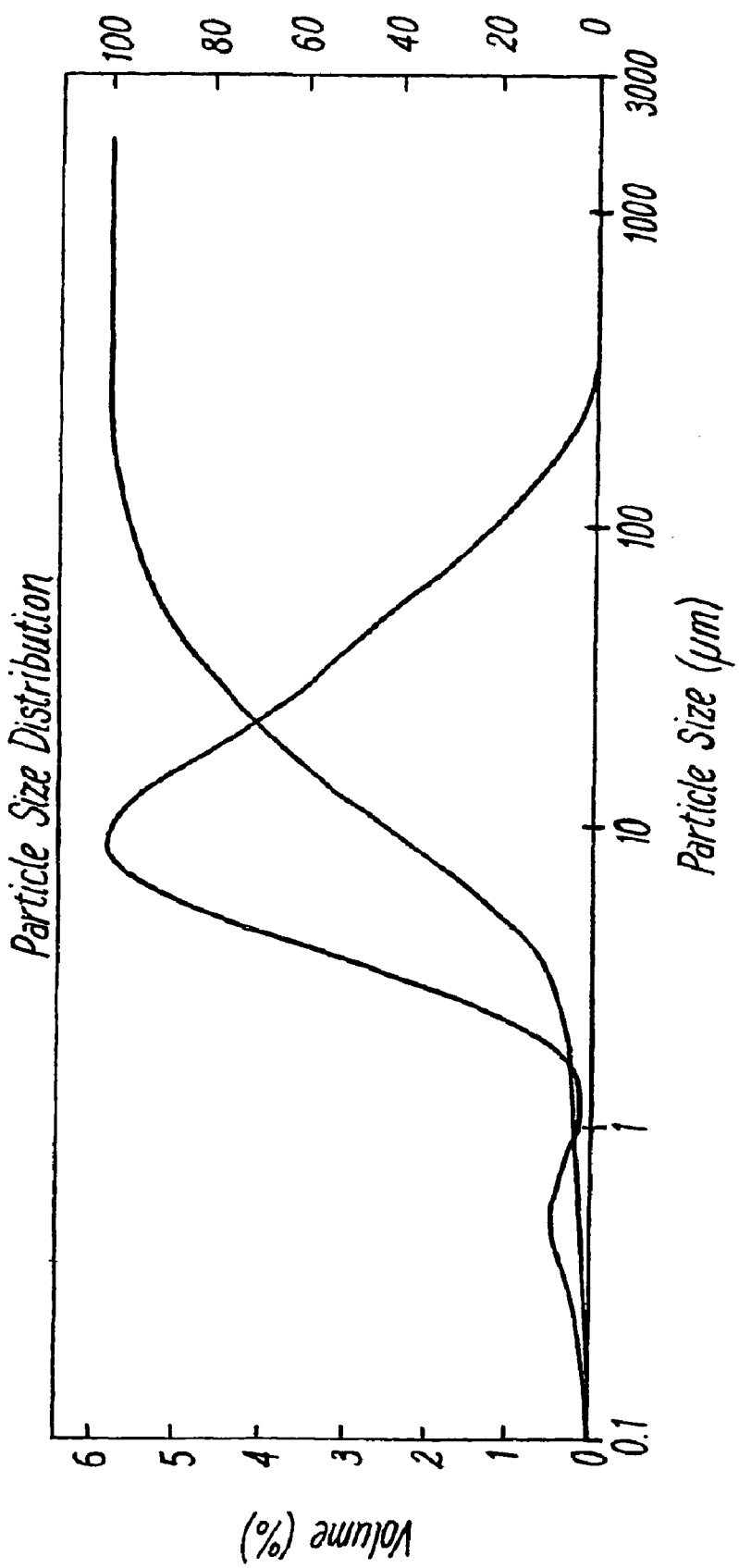
FIG. 9 is a graphical depiction of particle size distribution and a typical polymer product of a process according to the invention.

FIG. 9 shows the particle distribution of atomised polymer powder produced by such an arrangement. The product powder is found to comprise spherical or nearly spherical particles of defined size distribution depending on the dimension of the die orifice and the viscosity of the melt. The process can be carried out under conditions such as to avoid risk of contamination of the product.

What is claimed is:

1. Apparatus for atomising liquid media comprising an ultrasonic gas atomisation nozzle having a gas flow path from a plenum chamber to a nozzle exit, the flow path being straight and being provided with a plurality of resonance cavities, and wherein the resonance cavities are spaced from both the plenum chamber and the nozzle exit.

2. Apparatus according to claim 1, in which the resonance cavities are spaced apart along the gas flow path.

3. Apparatus according to claim 1, in which the resonance cavities are inclined to the gas flow path such that the resonance cavities are convergent with the gas flow path in the direction of gas flow.

4. Apparatus according to claim 1, in which the resonance cavities are adapted to impose an ultrasonic frequency on the gas flow.

5. Apparatus according to claim 4, in which the frequency is in the range 20–60 KHz.

6. Apparatus according to claim 1, in which the gas flow path comprises an annular convergent nozzle and the resonance cavities comprise cylindrical cavities formed in both interior walls of the annular nozzle.

7. Apparatus according to claim 6, in which the diameters of the cavities are between $1/12$ and $1/8$ of the mean nozzle diameter.

8. Apparatus according to claim 7, having between ten and sixty cavities.

9. Apparatus according to claim 1, in which the gas flow path comprises a multi-jet arrangement.

10. Apparatus according to claim 9, in which the diameters of the cavities are between $1/10$ and $1/3$ of the diameter of the jets.

11. Apparatus according to claim 10, having between two and eight cavities in each jet.

12. Apparatus according to claim 6, in which the cavities are oriented at between 10° and 60° to the flow direction through the nozzles.

* * * * *